United States Patent
Saito et al.

(10) Patent No.: US 10,857,979 B2
(45) Date of Patent: Dec. 8, 2020

(54) SECURITY DEVICE, SECURITY CONTROL METHOD, PROGRAM, AND STORAGE MEDIUM

(71) Applicant: PIONEER CORPORATION, Tokyo (JP)

(72) Inventors: Takashi Saito, Saitama (JP); Tatsuya Fukuda, Saitama (JP); Yasunori Suzuki, Saitama (JP)

(73) Assignee: PIONEER CORPORATION, Tokyo (JP)

( * ) Notice: Subject to any disclaimer, the term of this patent is extended or adjusted under 35 U.S.C. 154(b) by 0 days.

(21) Appl. No.: 15/775,361

(22) PCT Filed: Nov. 11, 2016

(86) PCT No.: PCT/JP2016/083511
§ 371 (c)(1),
(2) Date: May 10, 2018

(87) PCT Pub. No.: WO2017/082388
PCT Pub. Date: May 18, 2017

(65) Prior Publication Data
US 2018/0370489 A1    Dec. 27, 2018

(30) Foreign Application Priority Data

Nov. 11, 2015 (JP) .................................. 2015-221351

(51) Int. Cl.
*B60R 25/31* (2013.01)
*H04Q 9/00* (2006.01)
(Continued)

(52) U.S. Cl.
CPC ............ *B60R 25/31* (2013.01); *B60R 25/102* (2013.01); *B60R 25/305* (2013.01); *B60R 25/33* (2013.01);
(Continued)

(58) Field of Classification Search
CPC ..... B60R 25/305; B60R 25/31; B60R 25/102; B60R 25/33; H04W 4/02; H04W 12/06;
(Continued)

(56) References Cited

U.S. PATENT DOCUMENTS 5,442,557 A * 8/1995 Kaneko .............. G01C 21/3632
340/990
5,949,375 A * 9/1999 Ishiguro .................. G01S 19/49
342/457
(Continued)

FOREIGN PATENT DOCUMENTS

JP     2006-72937 A    3/2006
JP     2007-126118 A   5/2007
(Continued)

OTHER PUBLICATIONS

International Search Report for related PCT Application No. PCT/JP2016/083511, dated Jan. 24, 2017; 4 pages.

*Primary Examiner* — Orlando Bousono
(74) *Attorney, Agent, or Firm* — Procopio, Cory, Hargreaves & Savitch LLP

(57) ABSTRACT

The above security device determines whether there occurs screening between a movable body such as a vehicle and a user, and controls the security level in accordance with the determination result. Specifically, the security device sets the security level high when there occurs screening between the movable body and the user, and sets the security level low when there occurs no screening.

12 Claims, 8 Drawing Sheets

(51) Int. Cl.
    *B60R 25/33*    (2013.01)
    *B60R 25/102*   (2013.01)
    *G08B 25/00*    (2006.01)
    *B60R 25/30*    (2013.01)
    *G08B 13/196*   (2006.01)
    *G08B 25/08*    (2006.01)

(52) U.S. Cl.
    CPC .......... *G08B 25/008* (2013.01); *H04Q 9/00* (2013.01); *G08B 13/19647* (2013.01); *G08B 25/08* (2013.01)

(58) Field of Classification Search
    CPC ............ G08C 2201/32; G08C 2201/91; G08C 17/02; G08B 25/008; G08B 25/08; G08B 13/19647; H04Q 9/00
    See application file for complete search history.

(56) References Cited

U.S. PATENT DOCUMENTS

| | | | | |
|---|---|---|---|---|
| 2001/0007089 A1* | 7/2001 | Takeuchi | G01C 21/3629 | 705/64 |
| 2001/0041960 A1* | 11/2001 | Hashida | G01C 21/20 | 701/431 |
| 2002/0041240 A1* | 4/2002 | Ikeda | G08B 25/016 | 340/993 |
| 2002/0049529 A1* | 4/2002 | Ikeda | G01C 21/26 | 701/461 |
| 2002/0188390 A1* | 12/2002 | Ichihara | G01C 21/36 | 701/36 |
| 2003/0033082 A1* | 2/2003 | Yanagidaira | G01C 21/26 | 701/431 |
| 2003/0050751 A1* | 3/2003 | Fukushima | G01C 21/3407 | 701/420 |
| 2003/0055556 A1* | 3/2003 | Hashida | G01C 21/20 | 701/408 |
| 2003/0078726 A1* | 4/2003 | Fukushima | G01C 21/3407 | 701/420 |
| 2004/0145241 A1* | 7/2004 | Arakawa | B60R 25/102 | 307/10.3 |
| 2004/0153238 A1* | 8/2004 | Miyahara | G01C 21/32 | 701/426 |
| 2005/0099323 A1* | 5/2005 | Hirose | G01C 21/3691 | 340/995.13 |
| 2005/0249351 A1* | 11/2005 | Miyahara | G06Q 99/00 | 380/255 |
| 2006/0064243 A1* | 3/2006 | Hirose | G01C 21/26 | 701/431 |
| 2006/0194507 A1* | 8/2006 | Yamaguchi | A63H 18/08 | 446/454 |
| 2007/0185644 A1* | 8/2007 | Hirose | G01C 21/265 | 701/532 |
| 2007/0250936 A1* | 10/2007 | Nakamura | H04L 63/105 | 726/27 |
| 2009/0096578 A1* | 4/2009 | Ogino | B60R 25/245 | 340/5.72 |
| 2009/0148152 A1* | 6/2009 | Kurane | G03B 29/00 | 396/429 |
| 2009/0312945 A1* | 12/2009 | Sakamoto | G01C 21/3691 | 701/532 |
| 2010/0174705 A1* | 7/2010 | Iwahori | G01C 21/26 | 707/723 |
| 2011/0006909 A1* | 1/2011 | Rekimoto | G01S 5/0236 | 340/8.1 |
| 2011/0007901 A1* | 1/2011 | Ikeda | H04B 5/02 | 380/270 |
| 2011/0035098 A1* | 2/2011 | Goto | G01C 21/3626 | 701/36 |
| 2011/0043658 A1* | 2/2011 | Sasai | G11B 27/3027 | 348/231.3 |
| 2011/0231018 A1* | 9/2011 | Iwai | B25J 9/1664 | 700/253 |
| 2011/0312278 A1* | 12/2011 | Matsushita | H04L 12/40013 | 455/66.1 |
| 2012/0019674 A1* | 1/2012 | Ohnishi | G08C 17/00 | 348/207.1 |
| 2012/0253666 A1* | 10/2012 | Adachi | G01C 21/3638 | 701/457 |
| 2012/0327922 A1* | 12/2012 | Takahashi | G01S 5/0263 | 370/338 |
| 2012/0329480 A1* | 12/2012 | Hashimoto | G01S 19/34 | 455/456.1 |
| 2013/0019317 A1* | 1/2013 | Whelan | H04B 7/18593 | 726/26 |
| 2013/0031598 A1* | 1/2013 | Whelan | G01S 1/725 | 726/1 |
| 2013/0184001 A1* | 7/2013 | Rekimoto | G01S 5/0236 | 455/456.1 |
| 2013/0231861 A1* | 9/2013 | Yokoyama | G01C 21/3647 | 701/523 |
| 2013/0237174 A1* | 9/2013 | Gusikhin | H04W 4/90 | 455/404.1 |
| 2013/0247117 A1* | 9/2013 | Yamada | G08C 17/02 | 725/93 |
| 2013/0275896 A1* | 10/2013 | Takeda | G06F 3/048 | 715/764 |
| 2013/0305357 A1* | 11/2013 | Ayyagari | H04W 12/06 | 726/22 |
| 2014/0009268 A1* | 1/2014 | Oshima | G08C 17/02 | 340/12.5 |
| 2014/0012499 A1* | 1/2014 | Hirose | G01C 21/28 | 701/470 |
| 2014/0173237 A1* | 6/2014 | Takano | G06F 21/79 | 711/163 |
| 2014/0201663 A1* | 7/2014 | Takeda | G06F 3/048 | 715/769 |
| 2014/0288819 A1* | 9/2014 | Kita | G01C 21/165 | 701/409 |
| 2014/0301380 A1* | 10/2014 | Rekimoto | G01S 5/0236 | 370/338 |
| 2015/0087266 A1* | 3/2015 | Nakazawa | G06F 3/0483 | 455/411 |
| 2015/0180866 A1* | 6/2015 | Hama | G06K 9/00087 | 726/6 |
| 2015/0186729 A1* | 7/2015 | Saito | G06K 9/00671 | 382/153 |
| 2015/0235016 A1* | 8/2015 | Sun | G06F 21/35 | 726/19 |
| 2015/0268661 A1* | 9/2015 | Ogawa | G05B 19/4097 | 700/182 |
| 2015/0283984 A1* | 10/2015 | Uno | G08G 1/164 | 701/71 |
| 2015/0294172 A1* | 10/2015 | Aoki | G06K 9/00892 | 348/77 |
| 2015/0310736 A1* | 10/2015 | Yamada | G08C 17/02 | 398/107 |
| 2015/0316473 A1* | 11/2015 | Kester | G01N 21/3504 | 250/339.02 |
| 2016/0011002 A1* | 1/2016 | Amano | G01C 21/32 | 701/516 |
| 2016/0148513 A1* | 5/2016 | Beaurepaire | G08G 1/143 | 701/117 |
| 2016/0251890 A1* | 9/2016 | Sakai | E05F 15/77 | 340/5.72 |
| 2016/0292865 A1* | 10/2016 | Floor | H04N 5/247 | |
| 2017/0286763 A1* | 10/2017 | Fukuda | G06T 7/254 | |
| 2018/0341812 A1* | 11/2018 | Floor | G06K 9/00724 | |

FOREIGN PATENT DOCUMENTS

| | | |
|---|---|---|
| JP | 2007-265288 A | 10/2007 |
| JP | 2011-068347 A | 4/2011 |
| JP | 2014-048079 A | 3/2014 |

* cited by examiner

D1 : VEHICLE POSITION INFORMATION
D2 : GROUND OBJECT INFORMATION
D3 : ABNORMALITY DETECTION INFORMATION
D4 : USER POSITION INFORMATION

D1 : VEHICLE POSITION INFORMATION
D2 : GROUND OBJECT INFORMATION
D3 : ABNORMALITY DETECTION INFORMATION
D4 : USER POSITION INFORMATION

D1 : VEHICLE POSITION INFORMATION
D2 : GROUND OBJECT INFORMATION
D3 : ABNORMALITY DETECTION INFORMATION
D4 : USER POSITION INFORMATION

SECURITY DEVICE, SECURITY CONTROL METHOD, PROGRAM, AND STORAGE MEDIUM

CROSS-REFERENCE TO RELATED APPLICATIONS

This application is a U.S. National Stage entry of PCT Application No: PCT/JP2016/083511 filed Nov. 11, 2016, which claims priority to Japanese Patent Application No. 2015-221351, filed Nov. 11, 2015, the contents of which are incorporated herein by reference.

TECHNICAL FIELD

The present invention relates to a technique of controlling a security level of a movable body.

BACKGROUND TECHNIQUE

There is known a security device loaded on a vehicle for preventing vehicle theft. Patent Reference-1 discloses setting a security level based on a distance between a vehicle parking place and an existing position of a user in a vehicle theft prevention system including an onboard device and a management center. Specifically, this system increases the security level when the distance between the vehicle parking place and the existing position of the user is far, and decreases the security level when the distance is near.

PRIOR ART REFERENCES

Patent References

Patent Reference-1: Japanese Patent application Laid-Open under No. 2006-72937

SUMMARY OF THE INVENTION

Problem to be Solved by the Invention

If the security level is simply changed in accordance with the distance between the vehicle and the user like Patent Reference-1, the security level is decreased when the distance between the vehicle and the user is near. For example, when an owner of a vehicle parks the vehicle in a parking lot of a building and stays in the building, the security level is decreased in Patent Reference-1 because the distance between the user and the vehicle is near. In this case, however, it is problematic to decrease the security level because actually the vehicle is screened by the building and the user cannot watch the vehicle. Patent Reference-1 does not cope with such a situation that the security level must be increased even if the distance between the user and the vehicle is near.

The above is an example of the problem to be solved by the present invention. It is an object of the present invention to appropriately control the security level in accordance with the situation of a user and a movable body.

Means for Solving the Problem

An invention described in claims is a security device comprising: a determination unit configured to determine whether there occurs screening between a movable body and a user; and a control unit configured to control a security level of the movable body in accordance with a determination result of the determination unit.

Another invention described in claims is a security control method executed by a security device, comprising: a determination process of determining whether there occurs screening between a movable body and a user; and a control process of controlling a security level of the movable body in accordance with a determination result of the determination process.

Another invention described in claims is a program executed by a security device including a computer, the program causing the computer to function as: a determination unit configured to determine whether there occurs screening between a movable body and a user; and a control unit configured to control a security level of the movable body in accordance with a determination result of the determination unit.

DETAILED DESCRIPTION OF THE PREFERRED EMBODIMENTS

Figure 1:
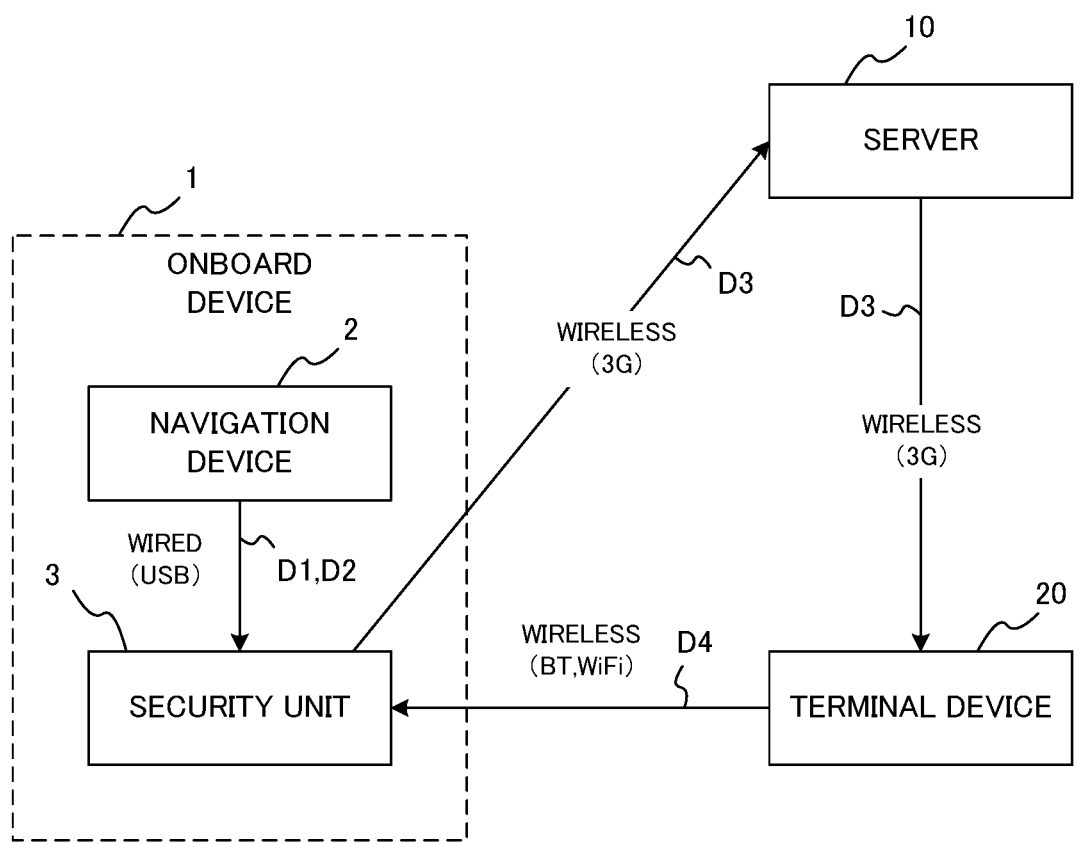
FIG. 1 illustrates a configuration of a security system according to embodiments.

According to one aspect of the present invention, there is provided a security device comprising: a determination unit configured to determine whether there occurs screening between a movable body and a user; and a control unit configured to control a security level of the movable body in accordance with a determination result of the determination unit.

The above security device determines whether there occurs screening between the movable body and the user, and controls the security level in accordance with the determination result. For example, the security device sets the security level high when there occurs screening between the movable body and the user, and sets the security level low when there occurs no screening. Thus, the security of the movable body can be managed with an appropriate security level in accordance with a situation.

One mode of the above security device further comprises: a movable body information obtaining unit configured to obtain position information of the movable body; a user information obtaining unit configured to obtain current position information of the user; and a screening object information obtaining unit configured to obtain information related to a screening object, wherein the determination unit determines whether there occurs screening, based on the position information of the movable body, the current position information of the user and the information related to the screening object. In this mode, it is determined whether there occurs screening between the movable body and the user based on the information related to the screening object.

In another mode of the above security device, the user information obtaining unit obtains information indicating a direction that the user is facing, and the control unit controls the security level based on the determination result of the determination unit and the direction that the user is facing. In this mode, the security level is controlled in consideration of the direction that the user is facing.

In still another mode of the above security device, the position information of the movable body includes an altitude of the movable body, the current position information of the user includes an altitude of the user, and the control unit controls the security level based on the determination result of the determination unit and a difference between the altitude of the movable body and the altitude of the user. In this mode, the security level is controlled in consideration of the altitude difference between the movable body and the user.

In a preferred example of the above security device, the user information obtaining unit obtains the current position information of the user from a terminal device that the user is carrying. In another preferred example of the above security device, the user information obtaining unit obtains the current position information of the user from an imaging device loaded on the movable body.

In still another mode of the above security device, the screening object information obtaining unit obtains the information related to the screening object existing in a predetermined range from the movable body. In this mode, the amount of the information to be obtained, related to the screening object, may be reduced, and quick processing can be done.

In still another mode of the above security device, the user is a person concerned with an owner of the movable body. In this mode, not only the owner of the movable body, but also the person concerned can control the security of the movable body.

According to another aspect of the present invention, there is provided a security control method executed by a security device, comprising: a determination process of determining whether there occurs screening between a movable body and a user; and a control process of controlling a security level of the movable body in accordance with a determination result of the determination process. By this method, the security of the movable body can be managed with an appropriate security level in accordance with a situation.

According to still another aspect of the present invention, there is provided a program executed by a security device including a computer, the program causing the computer to function as: a determination unit configured to determine whether there occurs screening between a movable body and a user; and a control unit configured to control a security level of the movable body in accordance with a determination result of the determination unit. By executing this program by the security device, the security of the movable body can be managed with an appropriate security level in accordance with a situation. The above program may be handled in a manner stored in a storage medium.

EMBODIMENTS

Preferred embodiments of the present invention will be described below with reference to the attached drawings.

[System Configuration]

FIG. 1 illustrates a configuration of a security system according to embodiments. The security system includes an onboard device 1, a server 10 and a terminal device 20. The onboard device 1 is loaded on a vehicle, and includes a navigation device 2 and a security unit 3. The navigation device 2 and the security unit 3 are connected by a wired connection such as a USB. The server 10 is communicable with the security unit 3 in the onboard device 1 and the terminal device 20 by wireless communication such as 3G, for example. Also, the terminal device 20 is communicable with the server 10 by wireless communication such as 3G, and is communicable with the security unit 3 via wireless communication utilizing Bluetooth (Registered Trademark) and WiFi (Registered Trademark).

The navigation device 2 is a car navigation device loaded on the vehicle, and may be a type mounted on the vehicle or a detachable portable type. The navigation device 2 measures a current position of the vehicle, and supplies the position information D1 of the vehicle (hereinafter referred to as "vehicle position information") at the time when the vehicle stops to the security unit 3.

Also, the navigation device 2 stores map information and ground object information in an internal memory, and supplies the ground object information D2 to the security unit 3. Here, "the ground object" is an object existing on the ground, and includes artifacts such as buildings and bridges as well as natural objects such as trees and woods. Also, "the ground object information" is information indicating a position, a shape and a size (i.e., an area occupied by the ground object) of the ground object. As described later, in this embodiment, the ground object information is used to determine whether or not screening occurs between the user and the vehicle, and it is necessary for the ground object information to include a certain level of information required for such a determination. It is noted that the ground object is an example of "a screening object" of the present invention.

The security unit 3 is a device for monitoring the security of the vehicle, and may be a drive recorder, for example. The security unit 3 is connected to a control device of the vehicle, and receives a signal indicating ON/OFF of the accessory (ACC) of the vehicle. Also, the security unit 3 monitors the situation around the vehicle based on captured images, and transmits abnormality detection information D3 to the server 10 when it detects an abnormality based on a predetermined conditions.

The security unit 3 is set to different security levels when it operates. Typically, when the security unit 3 is switched ON, i.e., the security unit 3 is validated, the security level is high. When the security unit 3 is switched OFF, i.e., the security unit 3 is invalidated, the security level is low.

Three or more security levels may be set to the security unit 3. For example, if the security unit 3 is a device like a drive recorder which captures surrounding images, the security level can be changed by changing resolution of the captured image, changing frequency of capturing images, or changing the range of capturing images. As a specific example, when the resolution of the captured images is changed in three-stages, the security level is highest in a mode in which the resolution is set to the highest resolution, the security level is second highest in a mode in which the resolution is set to the second highest resolution, and the security is low in a mode in which the resolution is set to the lowest resolution. When the frequency of capturing images is changed, the security level is high in a mode in which the frequency of capturing images is high, and the security is low in a mode in which frequency of capturing images is low. When the range of capturing images is changed, the security level is high in a mode in which the image capturing range is broad, e.g., in all directions, and the security level is low in a mode in which the image capturing range is narrow, e.g., only the forward area of the vehicle.

When the server 10 receives the abnormality detection information D3 from the security unit 3, the server 10 transfers it to the terminal device 20 and notifies the user of the terminal device 20 that an abnormality occurs in the vehicle.

The terminal device 20 may be a smartphone, a cell phone and a wearable terminal, for example, and is capable of obtaining current position information by GPS or the like. When the terminal device 20 is the wearable terminal, it can obtain direction information indicating the direction of the user by an internal sensor. The terminal device 20 transmits its current position to the security unit 3 as current position information of the user (hereinafter referred to as "user position information") D4. If the terminal device 20 can obtain the direction information of the user as described above, the terminal device 20 transmits the user position information D4 including the direction information of the user to the security unit 3.

In the above configuration, the security unit 3 is an example of a determination unit, a control unit and a screening object information obtaining unit of the present invention. The navigation device 2 is an example of a movable body information obtaining unit of the present invention, and the terminal device 20 is an example of a user information obtaining unit of the present invention.

[Security Control]

1st Embodiment

Next, a first embodiment of the security control executed by the security unit 3 will be described. In the first embodiment, the security unit 3 determines whether or not the user carrying the terminal device 20 exists within a watchable range in which the user can watch the vehicle. If the user is within the watchable range, the security unit 3 sets the security level low, and if the user is not within the watchable range, the security unit 3 sets the security level high.

Figure 2:
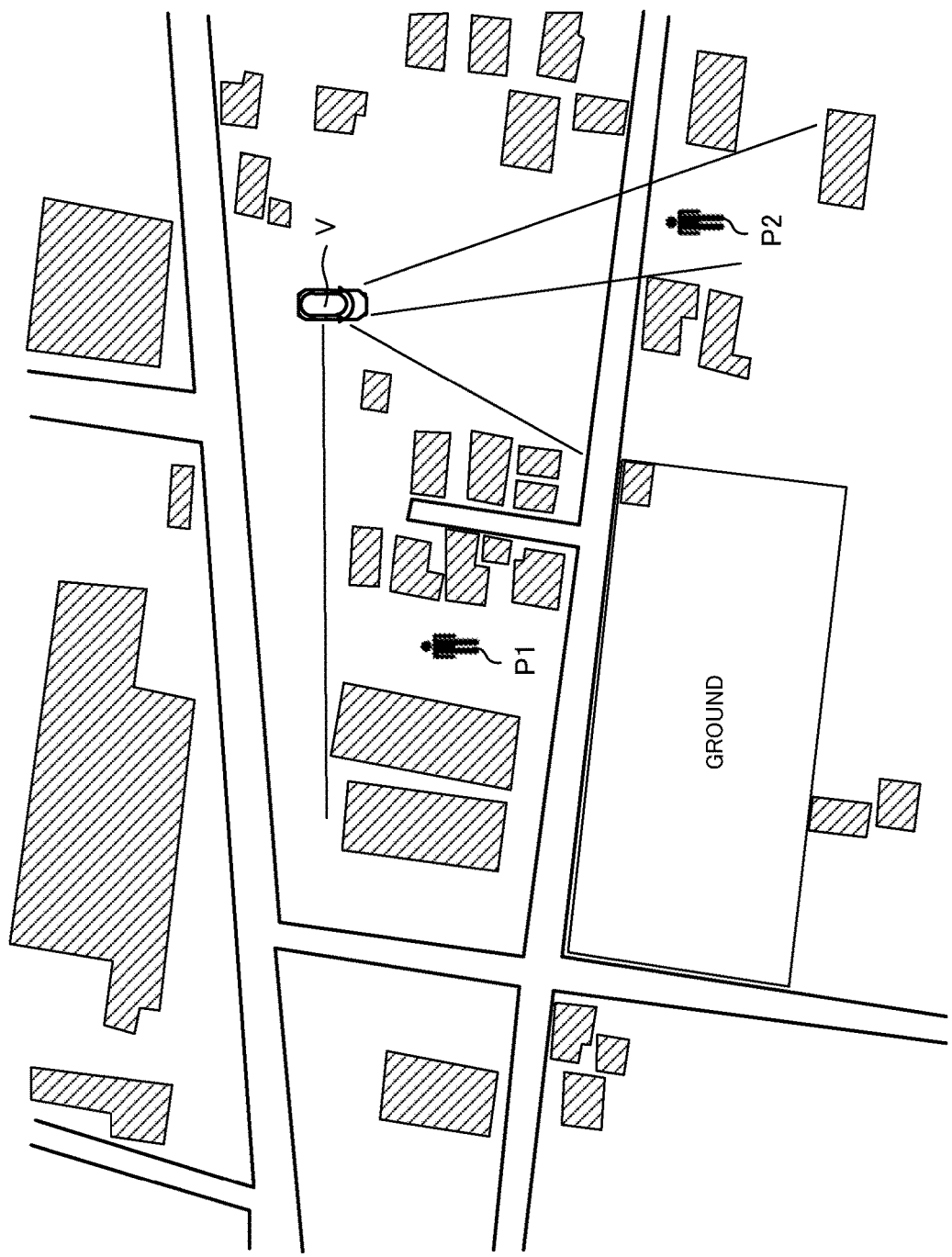
FIG. 2 is a diagram illustrating the security control according to a first embodiment.

FIG. 2 is a diagram illustrating the security control according to the first embodiment. In FIG. 2, ground objects such as buildings are indicated by oblique lines. As illustrated, the vehicle V is parked at a certain position in a city area. When the user carrying the terminal device 20 is located at the position P1, there occurs screening by the ground objects such as buildings between the user and the vehicle V, and the user cannot watch the vehicle V. Therefore, the security unit 3 sets the security level high. In contrast, when the user is located at the position P2, there occurs no screening between the user and the vehicle V, and the user can watch the vehicle V. Therefore, the security unit 3 sets the security level low.

As already mentioned, "setting the security level high" includes validating the security, changing the security level to the level higher than the present level, and setting the security level to higher level among three or more security levels. Also, "setting the security level low" includes invalidating the security, changing the security level to the level lower than the present level, and setting the security level to lower level among three or more security levels.

Figure 3:
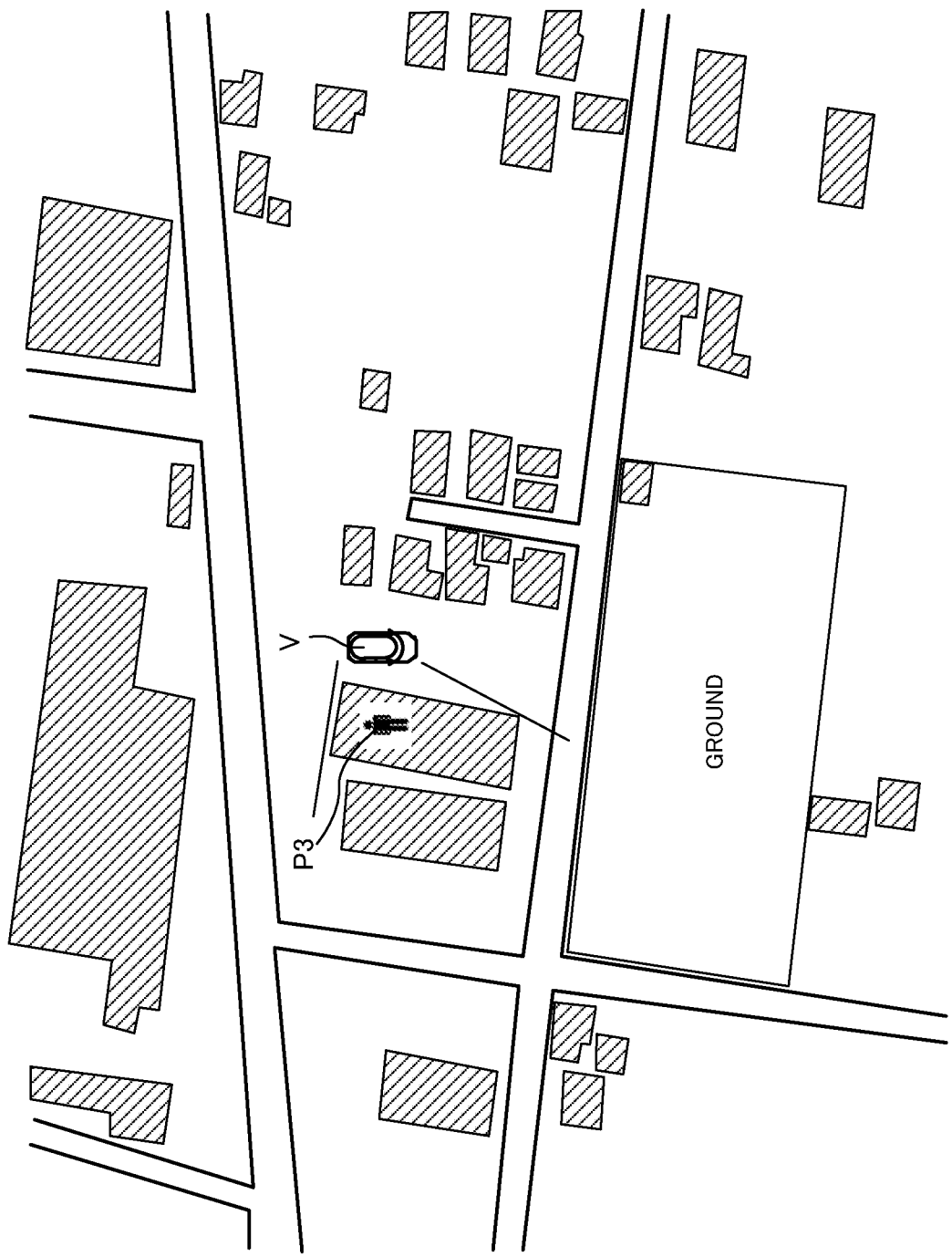
FIG. 3 is another diagram illustrating the security control according to the first embodiment.

FIG. 3 is another diagram illustrating the security control according to the first embodiment. In FIG. 3, ground objects such as buildings are indicated by oblique lines. In the example of FIG. 3, the user parks the vehicle V near the building, enters the building and is staying at the position P3 in the building. In this case, there occurs screening by the building between the user and the vehicle V, and the user cannot watch the vehicle V. Therefore, the security unit 3 sets the security level high.

In this case, the security unit 3 does not need to consider the distance between the user and the vehicle V. Namely, even if the distance between the user and the vehicle V is near, if there occurs screening between the user and the vehicle V, the security unit 3 sets the security level high. In this way, in the first embodiment, the security level can be appropriately set in accordance with whether or not there occurs screening between the user and the vehicle, i.e., whether or not the user can watch the vehicle.

Figure 4:
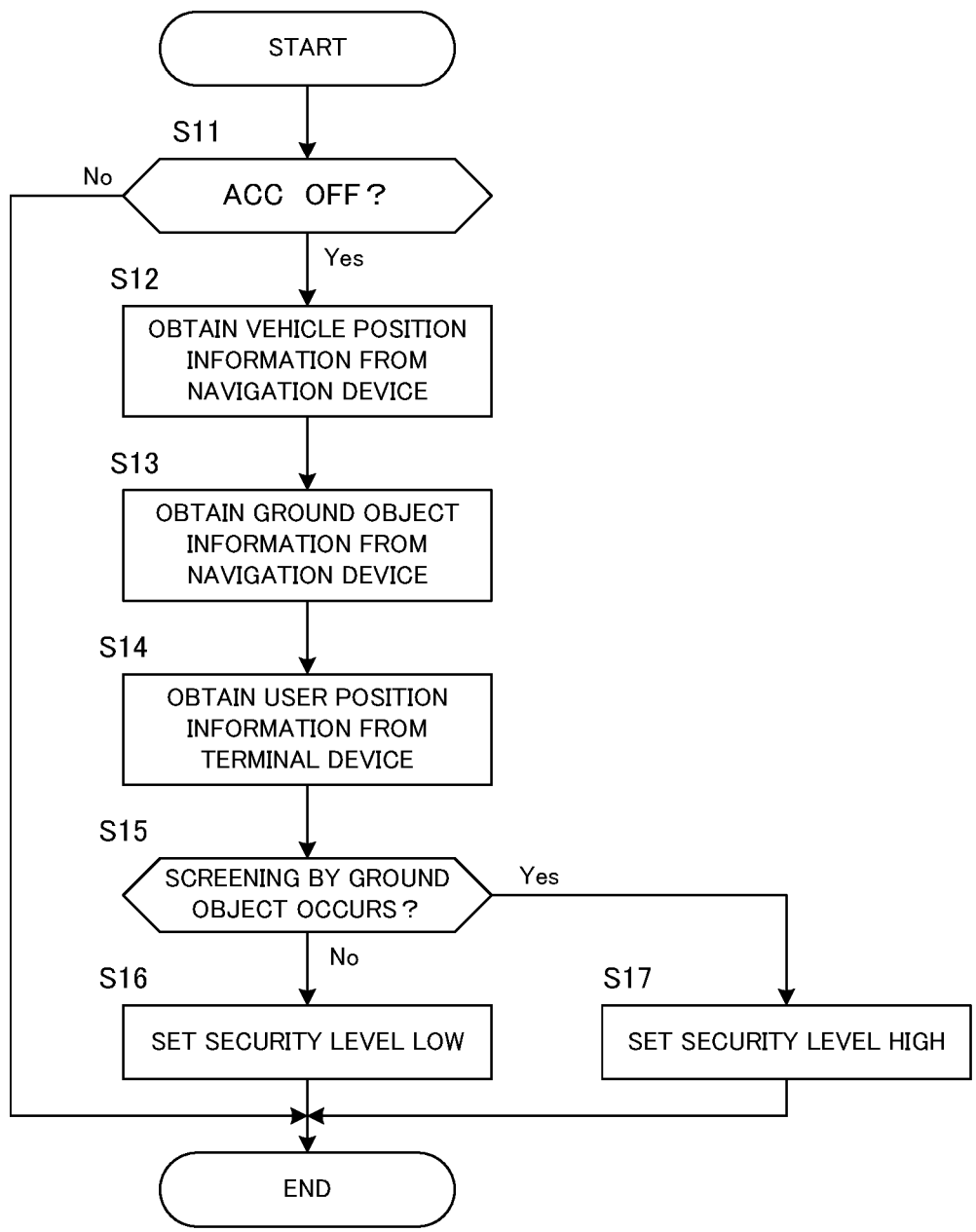
FIG. 4 is a flowchart of the security control according to the first embodiment.

FIG. 4 is a flowchart of the security control according to the first embodiment. This processing is executed by the security unit 3. Actually, this processing can be achieved by a computer such as a CPU included in the security unit 3 executing a program prepared in advance. This processing is repeated every predetermined time.

First, the security unit 3 determines whether or not the accessory (ACC) of the vehicle is turned OFF, based on the signal from the control device of the vehicle (step S11). When the accessory of the vehicle is not turned OFF (step S11: No), the processing ends.

On the other hand, when the accessory of the vehicle is turned OFF (step S11: Yes), the security unit 3 obtains vehicle position information indicating the current position of the vehicle from the navigation device 2 (step S12). Also, the security unit 3 obtains ground object information from the navigation device 2 (step S13). Further, the security unit 3 obtains, from the terminal device 20, user position information indicating the current position of the user carrying the terminal device 20 (step S14).

Next, the security unit 3 determines whether or not there occurs screening by the ground object between the user position and the vehicle position (step S15). Specifically, the security unit 3 determines whether or not there is a ground object between the user and the vehicle, based on the vehicle position information, the user position information and the ground object information. For example, the security unit 3 sets a straight line connecting the current position of the user and the current position of the vehicle on the map, and determines whether or not the straight line is screened by the ground object in consideration of the shape and size of the ground object including the height (i.e., the area occupied by the ground object).

When there occurs no screening between the user position and the vehicle position (step S15: No), the security unit 3 sets the security level low (step S16). On the contrary, when there occurs screening between the user position and the vehicle position (step S15: Yes), the security unit 3 sets the security level high (step S17). Then, the processing ends.

2nd Embodiment

Next, a second embodiment of the security control executed by the security unit 3 will be described. The second embodiment is applied to the case where the terminal device 20 of the user can detect the direction of the user. In the second embodiment, in addition to the control of the first embodiment, the security unit 3 sets the security level high when the user is not facing the direction of the vehicle, even if there occurs no screening between the user position and the vehicle position.

Figure 5:
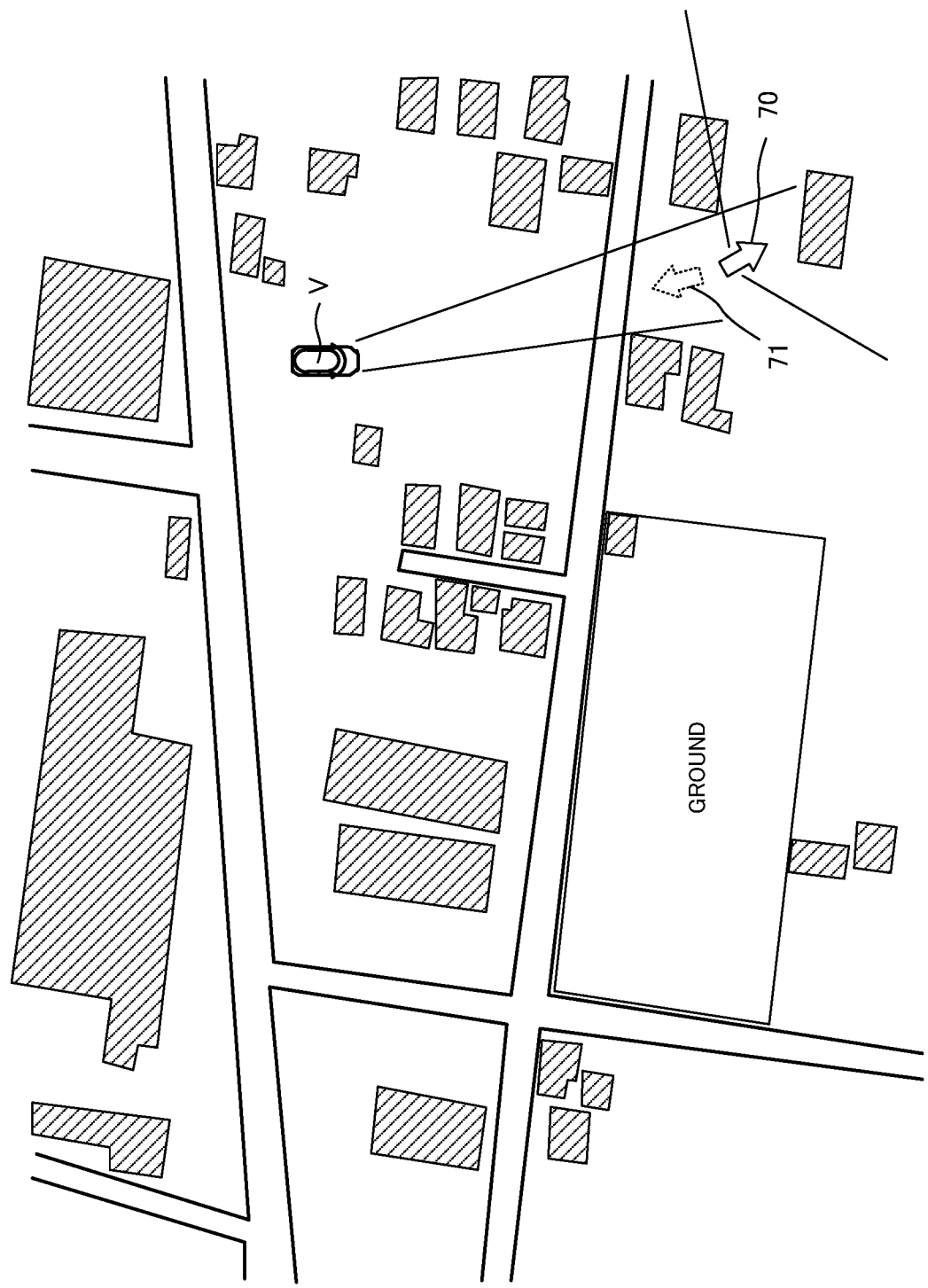
FIG. 5 is a diagram illustrating the security control according to a second embodiment.

FIG. 5 is a diagram illustrating the security control according to the second embodiment. In FIG. 5, ground objects such as buildings are indicated by oblique lines. The solid arrow 70 and the broken arrow 71 indicate the direction that the user is facing. As illustrated, the vehicle V is stopped at a certain position in the city area. When the user carrying the terminal device 20 is located at the position of the arrow 70, there occurs no screening between the user and the vehicle V. In this case, however, as shown by the arrow 70, the user is facing the direction opposite to the vehicle V and the user cannot watch the vehicle V. Therefore, the security unit 3 sets the security level high. On the other hand, when the user is facing the direction of the vehicle V as shown by the broken arrow 71, the user can watch the vehicle V. Therefore, the security unit 3 sets the security level low. In this way, according to the second embodiment, since the direction of the user is taken into consideration, the security level can be appropriately set in accordance with the actual situation.

Figure 6:
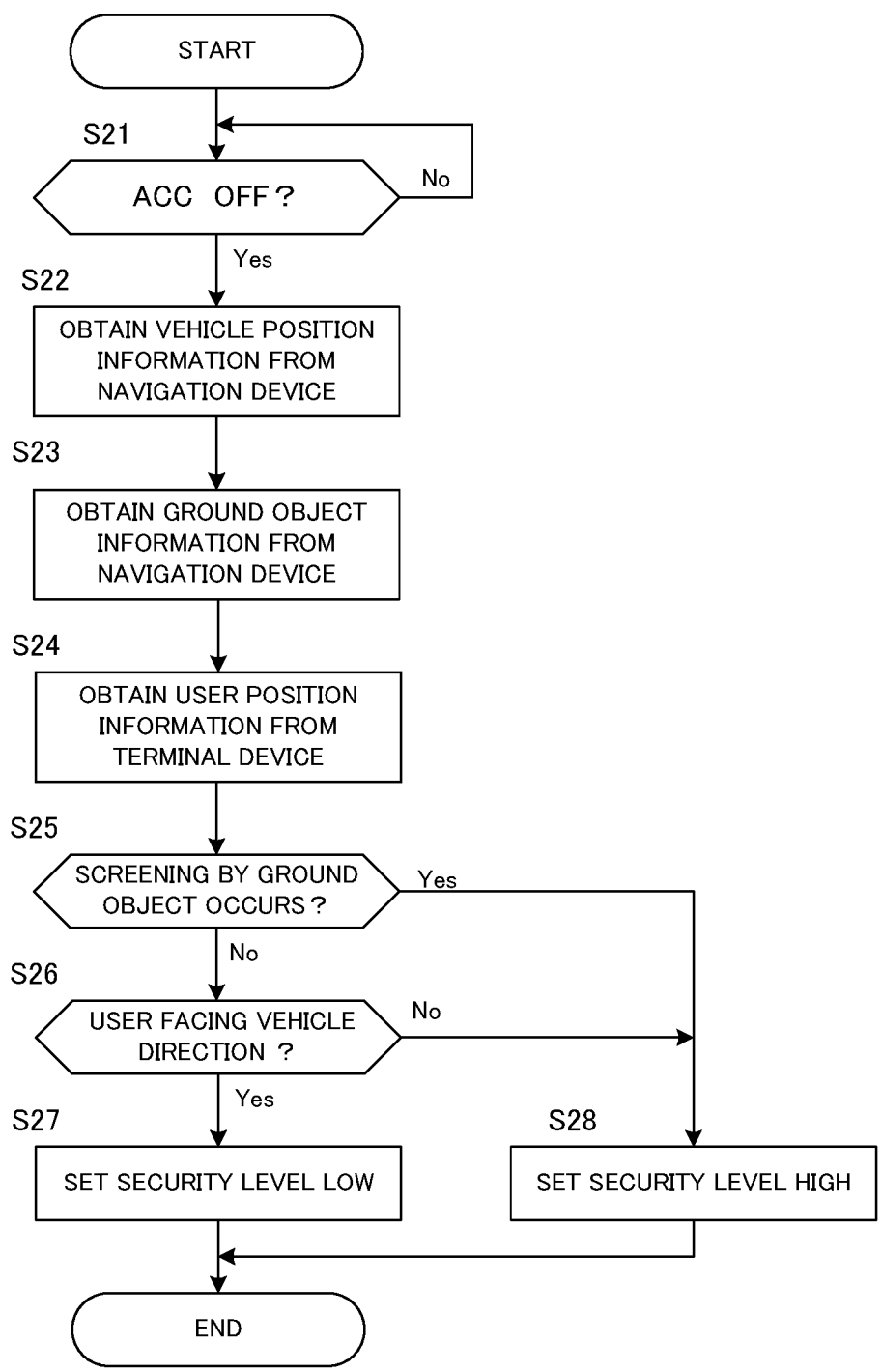
FIG. 6 is a flowchart of the security control according to the second embodiment.

FIG. 6 is a flowchart of the security control according to the second embodiment. Since steps S21 to S25 in the security control according to the second embodiment are the same as steps S11 to S15 in the security control according to the first embodiment, the description thereof will be omitted. However, in the second embodiment, the terminal device 20 detects the direction of the user, and the security unit 3 obtains the user position information including the direction information of the user from the terminal device 20 in step S24.

In step S25, when there occurs screening between the user position and the vehicle position (step S25: Yes), the security unit 3 sets the security level high (step S28), and ends the processing. On the other hand, when there occurs no screening between the user position and the vehicle position (step S25: No), the security unit 3 determines whether or not the user is facing the direction of the vehicle, based on the direction information of the user received from the terminal device 20 (step S26). When the user is facing the direction of the vehicle (step S26: Yes), the security unit 3 sets the security level low (step S27). On the contrary, when the user is not facing the direction of the vehicle (step S26: No), the security unit 3 sets the security level high (step S28). Then, the processing ends.

[Other Examples of System Configuration]

Figure 7:
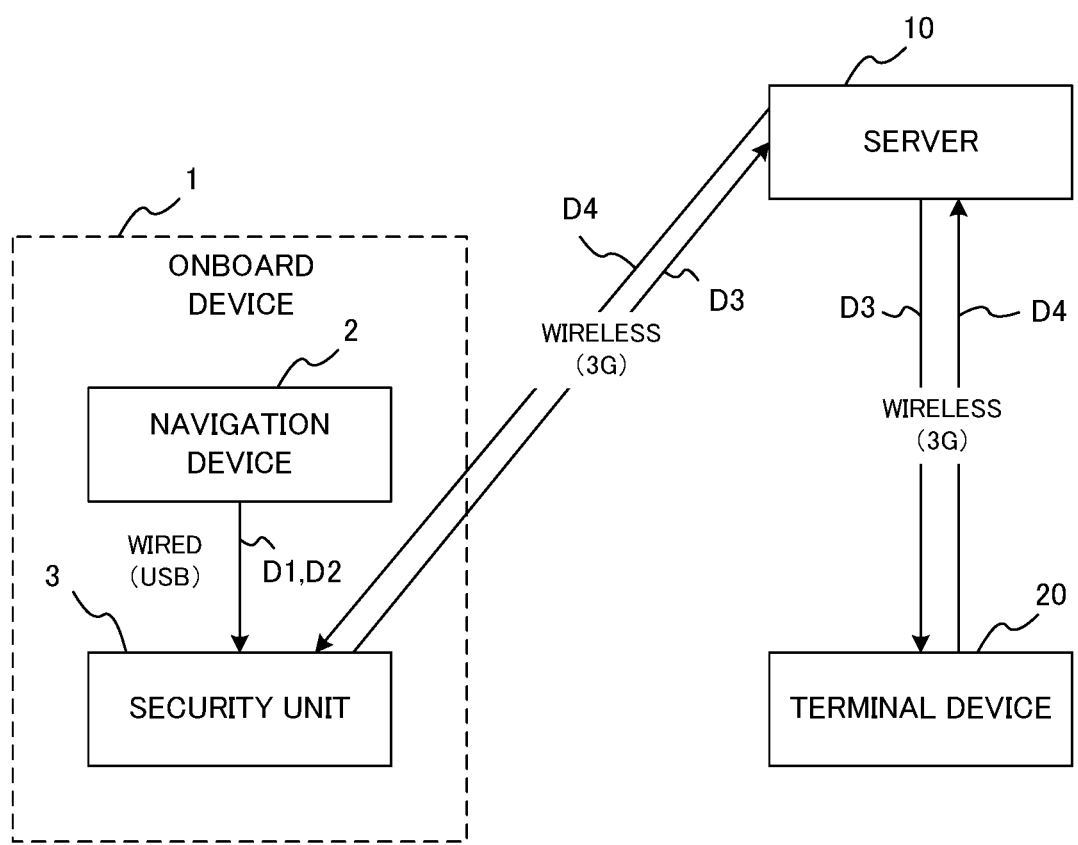
FIG. 7 illustrates another configuration example of the security system.

FIG. 7 illustrates another configuration example of the security system. As is understood in comparison with FIG. 1, the system configuration example shown in FIG. 7 is applied to the case where the security unit 3 and the terminal device 20 do not or cannot directly communicate with each other. In this case, the security unit 3 obtains the user position information D4 via the server 10. Namely, the terminal device 20 transmits the user position information D4 to the server 10, and the server 10 transmits the user position information D4 to the security unit 3. Other points are the same as the system configuration shown in FIG. 1.

Figure 8:
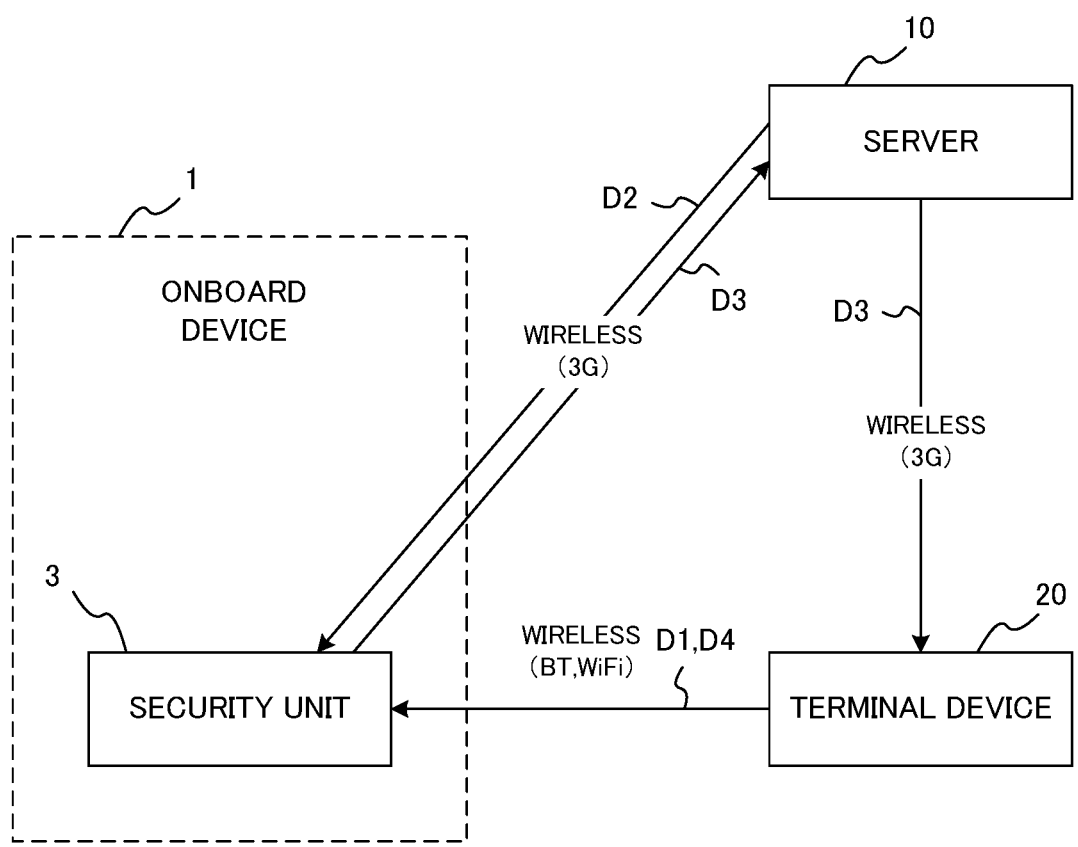
FIG. 8 illustrates still another configuration example of the security system.

FIG. 8 illustrates still another configuration example of the security system. As is understood in comparison with FIG. 1, the system configuration example shown in FIG. 8 is applied to the case where the vehicle does not have the navigation device 2. In this case, the vehicle position information D1 is supplied from the terminal device 20 to the security unit 3. Namely, when the vehicle stops, specifically when the accessory of the vehicle is turned OFF, the terminal device 20 obtains the current position information of the terminal device 20 itself, and transmits it to the security unit 3. The security unit 3 stores the current position information received from the terminal device 20 at that time into a memory as the vehicle position information D1. After the user leaves the vehicle, the user position information D4 is transmitted from the terminal device 20 to the security unit 3 by wireless communication, similarly to the case of FIG. 1.

Also, the ground object information D2 is stored in the server 10, and the security unit 3 obtains the ground object information D2 from the server 10. Specifically, the security unit 3 transmits the vehicle position information, obtained from the terminal device 20 when the vehicle stopped, to the server 10, and receives the ground object information D2 in a predetermined range around the current vehicle position from the server 10. For example, "the predetermined range around the current vehicle position" may be a range of radius 100*m* from the vehicle position as a center, but is not limited to this example. Other points are the same as the system configuration shown in FIG. 1.

MODIFIED EXAMPLES

Next, modified examples of the above embodiments will be described. The following modified examples may arbitrarily be applied in combination.

1st Modified Example

The above embodiments use the ground object information prepared in advance and stored in the navigation device 2 or the server 10. Instead of or in addition to this, the ground object information may be obtained by the following methods. For example, ground objects can be specified by imaging the periphery of the vehicle by a camera loaded on the vehicle and executing image recognition processing. Also, ground objects may be specified by detecting the peripheral environment of the vehicle by using a sensor such as a three-dimensional LiDar (Light Detection and Ranging) loaded on the vehicle.

2nd Modified Example

In the security control of the second embodiment shown in FIG. 6, the security unit 3 determines whether or not the user is facing the direction of the vehicle in step S26, after determining whether or not there occurs screening between the user and the vehicle in step S25. However, steps S26 and S25 may be exchanged. Namely, the security unit 3 may first determine whether or not the user is facing the direction of the vehicle, and when the user is not facing the direction of the vehicle, the security unit 3 sets the security level high. On the contrary, when the user is facing the direction of the vehicle, the security unit 3 determines whether or not there occurs screening between the user and the vehicle. Then, the security unit 3 sets the security level high when there occurs screening, and sets the security level low when there occurs no screening.

3rd Modified Example

In addition to the above embodiments, altitude information of the current positions of the user and the vehicle may be used. Specifically, the navigation device 2 obtains the altitude of the vehicle, and the terminal device 20 obtains the altitude of the user. Even if there occurs no screening by the ground object between the vehicle and the user, when the altitude difference of the user and the vehicle is larger than a predetermined value, it is judged that the user cannot watch the situation of the vehicle, and the security unit 3 sets the security level high. A typical example is such a situation that the user parked the vehicle in a parking lot and moved to a viewing platform on a hill.

4th Modified Example

In the above embodiments, the user carrying the terminal device 20 is an owner of the vehicle. However, the embodiments may be applied to the case where the user is not the owner of the vehicle, but a person concerned with the owner of the vehicle, e.g., family or friends. In this case, an ID of the terminal device 20 of the person concerned is registered in the security unit 3 in advance, and the terminal device 20 of the person concerned may be treated in a same manner as the terminal device 20 of the owner.

5th Modified Example

Even in a case where the user is staying in a building like the example shown in FIG. 3, if the user can watch the vehicle through the window of the building or if the user is in a courtyard in a building site and can watch the vehicle, the security unit 3 may determine that there occurs no screening between the user and the vehicle and set the security level low. As a specific method in this case, for example, a camera loaded on the vehicle captures images in the direction of the user's terminal device 20, and the security unit 3 may determine that there occurs no screening if it is recognized that the user is in the captured images by image recognition.

6th Modified Example

In the above embodiments, the direction of the user is detected by the sensor installed in the terminal device 20 such as a wearable terminal. Instead, the direction of the user may be detected by image recognition of images captured by a camera loaded on the vehicle.

7th Modified Example

In the above embodiments, the security unit determines whether or not there occurs screening by a ground object such as a building or woods between the user and the vehicle. Other than ground objects, when there occurs screening between the user and the vehicle by a temporary obstacle, e.g., there is a crowd or a large truck is parking, the security unit 3 may set the security level high. In this case, for example, the direction of the user's terminal device 20 may be captured by a camera loaded on the vehicle, and it may be determined whether or not there occurs screening, based on the existence or non-existence of the user in the captured image. The above "temporary obstacle" also corresponds to an example of "screening object" of the present invention.

INDUSTRIAL APPLICABILITY

This invention can be used for a control device of a movable body.

BRIEF DESCRIPTION OF REFERENCE NUMBERS

1 Onboard Device
2 Navigation Device
3 Security Unit
10 Server
20 Terminal Device

The invention claimed is:

1. A security device comprising:
an onboard device configured to obtain position information of a movable body;
a terminal device configured to obtain current position information of a user; and
a computer configured to obtain information related to an object which prevents the user from viewing the movable body, determine whether the object, which prevents the user from viewing the movable body, exists between the movable body and the user, and generate a determination result of whether the object exists between the movable body and the user,
wherein the computer determines whether the object prevents the user from viewing the movable body, based on the position information of the movable body, the current position information of the user and the information related to the object which prevents the user from viewing the movable body,
wherein the computer is configured to control a security level of the movable body in accordance with the determination result,
wherein when the object does not exist between the movable body and the user, the security level is low, and when the object exists between the movable body and the user, the security level is high.

2. The security device according to claim 1,
wherein the terminal device obtains information indicating a direction that the user is facing, and
wherein the computer controls the security level based on the determination result of the computer and the direction that the user is facing.

3. The security device according to claim 1,
wherein the position information of the movable body includes an altitude of the movable body,
wherein the current position information of the user includes an altitude of the user, and
wherein the computer controls the security level based on the determination result and a difference between the altitude of the movable body and the altitude of the user.

4. The security device according to claim 1, wherein the terminal device obtains the current position information of the user from a terminal device that the user is carrying.

5. The security device according to claim 1, wherein the terminal device obtains the current position information of the user from an imaging device loaded on the movable body.

6. The security device according to claim 1, wherein the computer obtains the information related to the object preventing the user from viewing the movable body, existing in a predetermined range from the movable body.

7. The security device according to claim 1, wherein the user is a person concerned with an owner of the movable body.

8. A security control method executed by a security device comprising an onboard device configured to obtain position information of a movable body; and a terminal device configured to obtain current position information of a user, the method comprising:
an obtaining process of obtaining information related to an object which prevents the user from viewing the movable body;

a determination process of determining whether the object, which prevents the user from viewing the movable body, exists between the movable body and the user; and a control process of controlling a security level of the movable body in accordance with a determination result of the determination process, wherein the determination process determines whether the object prevents the user from viewing the movable body, based on the position information of the movable body, the current position information of the user and the information related to the object which prevents the user from viewing the movable body, wherein when the object does not exist between the movable body and the user, the security level is low, and when the object exists between the movable body and the user, the security level is high.

9. A non-transitory computer-readable medium storing a program executed by a security device including an onboard device configured to obtain position information of a movable body, a terminal device configured to obtain current position information of a use, and a computer, the program causing the computer to function as:

an obtaining unit configured to obtain information related to an object which prevents the user from viewing the movable body;

a determination unit configured to determine whether the object, which prevents the user from viewing the movable body, exists between the movable body and the user; and a control unit configured to control a security level of the movable body in accordance with a determination result of the determination unit, wherein the determination unit determines whether the object prevents the user from viewing the movable body, based on the position information of the movable body, the current position information of the user and the information related to the object which prevents the user from viewing the movable body, wherein when the object does not exist between the movable body and the user, the security level is low, and when the object exists between the movable body and the user, the security level is high.

10. A security device comprising:

navigation device configured to obtain position information of a movable body;

terminal device configured to obtain current position information of a user; and computer configured to obtain information related to an object preventing the movable body from being within the watchable range of the user, determine whether the object prevents the movable body from being within the watchable range of the user, based on the position information of the movable body, the current position information of the user and the information related to the object preventing the movable body from being within the watchable range of the user, and control a security level of the movable body in accordance with a determination result as to whether the object prevents the movable body from being within the watchable range of the user, wherein when the movable body is within the watchable range from the user, the security level is low, and when the movable body is not within the watchable range from the user, the security level is high.

11. The security device of claim 10, wherein the screening occurs when the user cannot observe the movable body due to the object which is preventing the movable body from being within the watchable range of the user being positioned in a line of sight between the user and the movable body.

12. The security device of claim 11, wherein the object preventing the movable body from being within the watchable range of the user comprises a building.

* * * * *